US005398435A

United States Patent [19]

Kanzelberger

[11] Patent Number: 5,398,435

[45] Date of Patent: Mar. 21, 1995

[54] PLASTIC PLATE WITH GRAPHICS

[76] Inventor: James C. Kanzelberger, P.O. Box 9, Manitowoc, Wis. 54220

[21] Appl. No.: 135,675

[22] Filed: Oct. 13, 1993

Related U.S. Application Data

[63] Continuation of Ser. No. 759,492, Sep. 13, 1991, Pat. No. 5,305,538.

[51] Int. Cl.⁶ .......................... A44C 3/00; B32B 31/00

[52] U.S. Cl. .......................................... 40/1.5; 40/626; 40/616; 156/290; 428/142

[58] Field of Search .................. 40/626, 358, 616, 1.5; 428/142, 141, 203; 283/81, 74; 156/290, 63; 206/575, 576, 377, 320, 818, 350, 224, 232

[56] References Cited

U.S. PATENT DOCUMENTS 2,035,760 3/1936 Reese .
3,494,818 2/1970 Merchese .
3,546,797 12/1970 Oleson .
3,620,362 11/1971 Valdes .
3,840,113 10/1974 Bartleson .
3,940,864 3/1976 Kanzelberger .
4,273,816 6/1981 Tollette .
4,459,772 7/1984 Kanzelberger .
4,499,126 2/1985 Suzuki .
4,510,006 4/1985 Lawson ................................ 283/74
4,833,489 4/1989 Cea .

*Primary Examiner*—Flemming Saether
*Attorney, Agent, or Firm*—Laff, Whitesel, Conte & Saret, Ltd.

[57] ABSTRACT

A do-it-yourself kit enables an end user to make his own graphics. A printer points graphics on the back of a transparent mylar tape. The tape has a pressure sensitive adhesive which is pressed on over a textured surface that enables air to escape at the interface between the adhesive and the plate.

9 Claims, 3 Drawing Sheets

FIG. 1
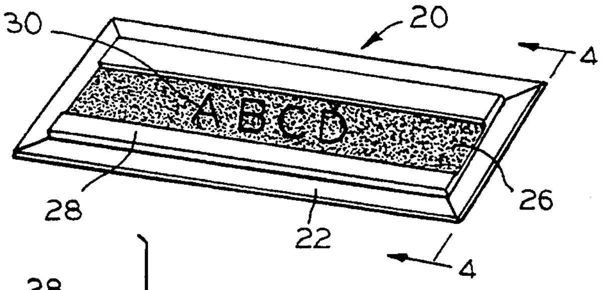
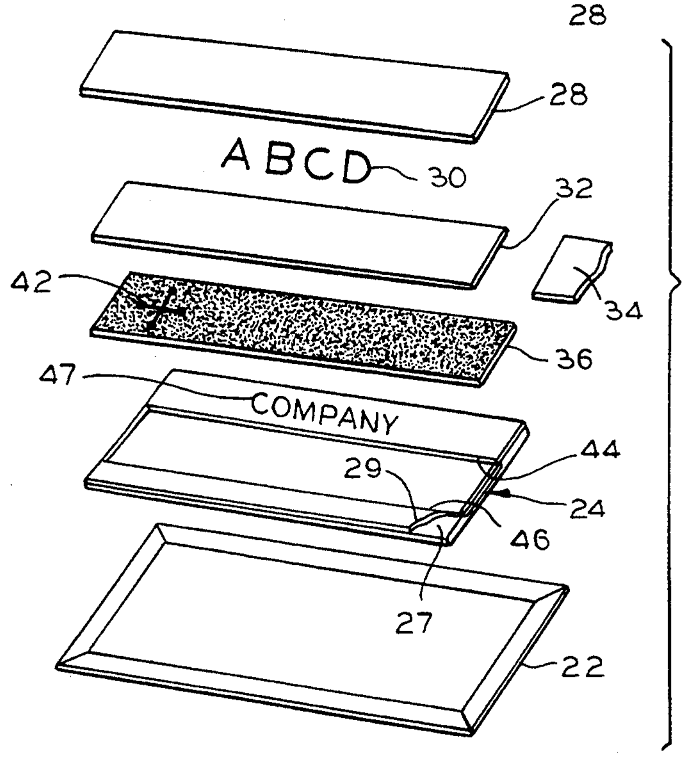
FIG. 2
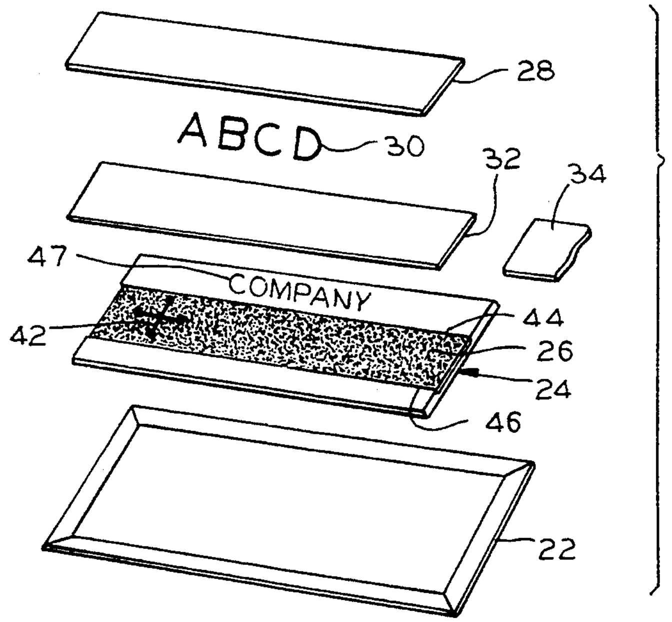
FIG. 3
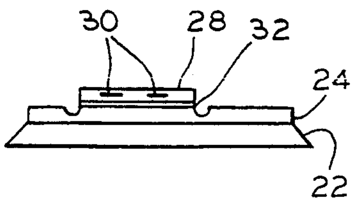
FIG. 4

PLASTIC PLATE WITH GRAPHICS

This is a continuation of prior application Ser. No. 07/759,492, filed Sep. 13, 1991, now U.S. Pat. No. 5,305,538, granted Apr. 26, 1994.

This invention relates to means for and methods of making plastic plates which may be adorned with graphics to make such things as badges, name tags, desk plates, wall plaques, decorative panels, place or seating cards, and the like. More particularly, the invention relates to such means and methods which may be made upon a do-it-yourself basis at the point of use.

A few patents which show similar plastic plates are U.S. Pat. Nos. 3,940,864; 4,047,996; 4,267,224; 4,125,655; 4,459,772; and 4,497,248. These patents show a plastic plate with a metallized surface and imprinted by a hot stamping process which requires a machine that is fairly expensive in a sense that most end users would rather pay a little more to have someone else make the plates than to buy the machine. Also, the hot stamping process requires some degree of expertise. While it is fairly easy for a person to acquire that expertise if he uses the machine every few days, it is not too easy for the casual user who may use it once every six or eight months.

From the manufacturer's viewpoint, the office procedures required to take orders, print or stamp the plates in response to the specific orders, ship the stamped plates, bill and collect, answer complaints, etc. requires a large service organization and creates many business problems. The sale of blanks which the customer may use to stamp himself is a little like selling the proverbial razor blades, a steady source of income without requiring the considerably overhead and problems of a service organization.

Another consideration is the time required to order, make, and receive the name cards, badges, and the like. By way of example, consider the U.S. Postal Service. Perhaps there is no other single organization which is as widespread with as many separate locations. Also, the Postal Service is the kind of organization that probably has a fairly constant turnover of personnel, with someone joining and leaving the organization almost everyday. Hence, there would be a steady stream of orders for name plates, badges and the like from the Postal Service. Internally, the Postal Service would have to devote a great effort to the task of buying made-to-order name tags. However, if Postal Offices procure their own supply of blanks and prints them on the spot, there is no need for central control over costs. It no longer takes a few weeks to get delivery of the badges. The public is not inconvenienced in the interim not knowing who is on the other side of the counter. Thus, an on-the-spot printing would simplify procedures and reduce costs.

A piecemeal approach to name tags, desk plates, etc. leads to uncoordinated graphics, where each sign, badge, desk plate, etc. in an office is a unique style which does not fit in with the style of any other sign. Thus, a complete line of do-it-yourself signs leads to a better looking office.

Another consideration is the waste of most prior art do-it-yourself graphics. For example, a sheet of transfer type may contain five to ten copies of each letter, number, and punctuation in both capital and small letters. By way of example, if there is an average of five copies of each of the 26-letters, 10-numbers, and 5-punctuations in capital and small sizes, there are 410 characters per page. The user will likely use 10–20% of these characters, thus producing a substantial waste.

Therefore, all parties are well served if the user is given the means for making his own name plates, badges, place cards, etc. He can make them exactly the way that he wants them. The manufacturer only needs to supply the materials required by the end user.

Accordingly, an object of this invention is to provide new and improved do-it-yourself means for and methods of making name tags, badges, wall plaques, place cards, and the like. Here an object is to provide beneficial, high quality graphics with an almost foolproof system with which almost anyone can produce near perfect results with no special training. In this connection, an object is to provide coordinated graphics wherein all of the described type of graphics in an office has the same overall "look".

Yet another object of the invention is to provide extremely low cost materials for making the described products.

In keeping with an aspect of the invention, a microprocessor controlled machine is used to print all of the alpha numerical characters on the back of a suitable transparent tape, such as a mylar tape. A double-sided adhesive tape is applied over the back of the mylar tape with the characters imprinted thereon. Then a release paper tape is placed over the adhesive tape. The resulting product which is delivered to the user has printing covered by mylar so that it cannot be rubbed off. The plastic plate which is to receive the mylar tape has a textured stripe running across its width so that when the transparent mylar tape is adhered thereto, it may be rubbed and worked into the texture so that the mylar appears to be part of the plastic itself and the mylar protects the graphics so that it will not be damaged by the rubbing. The user receives a kit including a number of tools which makes the entire process very simple and easy to use.

A preferred embodiment of the invention is shown in the attached drawings, wherein:

FIG. 1 shows the finished form of an exemplary plate embodying the invention;

FIG. 2 is an exploded view of a first embodiment of a name plate blank having a smooth surface for receiving a textured tape which is positioned between the smooth surface and the graphic tape;

FIG. 3 is an exploded view of a second embodiment of a name plate blank having a textured plate for receiving the graphic tape;

FIG. 4 is a cross-section of FIG. 1 taken along line 4—4 of FIG. 1;

FIG. 1 shows a name plate as an example of a finished graphic product 20 which may be displayed in any of many different ways. It could have a pin back for attachment to a lapel, a stand back for setting on a desk, a hanger for hanging on the wall, or any other suitable means for support and display.

Figure 5:
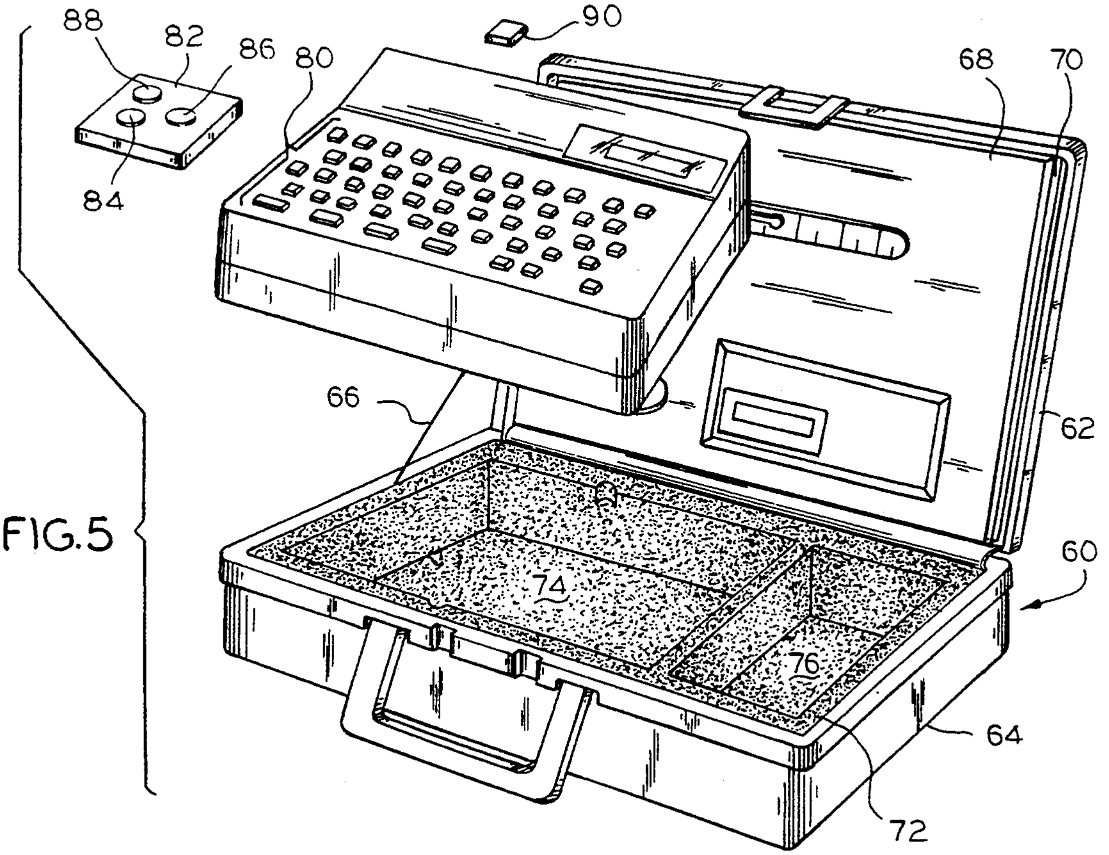
FIG. 5 is a perspective view of a kit which is furnished to the end user.
Figure 6:
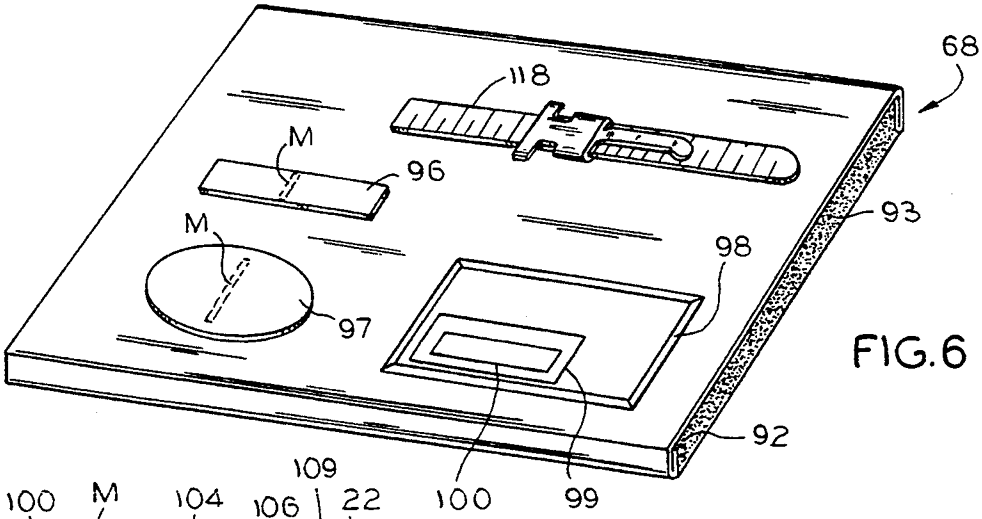
FIG. 6 is a perspective view of a work board which is included in the kit of FIG. 5.

The graphic product 20 includes a metal backing plate 22 with tapered sides to provide a finished appearance of a substantial device. This plate is preferably formed in a coin die and is shown in U.S. Pat. No. 4,459,772, and especially in FIG. 7 thereof. The surface of the plate may be a bright polish, enamel, or the like. A plastic plate 24 having a metallic appearance matching the appearance of metal backing plate 22 is bonded to the surface of plastic plate 24, as by means of a pressure sensitive adhesive, for example. This plastic plate may be the material described in the above-identified patents. Since the plastic plate 24 is very thin, it appears to be part of the metal backing plate 22.

In greater detail, plastic plate 24 (FIG. 2) includes a thermoplastic plate 27 covered on its upper surface by a thin polyester film 29. The upper surface film 29 has a heat insulating quality such that it plays no part in spreading heat during a debossment process. The film 29 may be "metallized", which is a term of art describing a layer of metal particles, a few molecules in thickness, covering the film (usually the lower surface of the film) to give it a brushed metal surface appearance. In the alternative, the film 29 may have any other suitable surface appearance, such as an enameled plate.

On its lower surface, plate 24 is covered by a substrate in the form of a release paper covering a pressure sensitive adhesive. The release paper substrate prevents a lateral displacement of the thermoplastic material 27 during a debossment which gives an appearance of engraved metal, as described in the above described patents. Therefore, plastic plate 24 may be quickly and easily bonded to the metal backing plate 22 by removing the release paper covering the adhesive and pressing plastic plate 24 onto metal plate 22.

A film of hot stamping foil (not shown) is placed over the surface of the plastic plate 24. Then, a heated die (also not shown) is lowered to deboss the thermoplastic plate 27 while transferring ink from the hot stamping foil into the bottom of the debossment. The transferred ink gives the visual impression of an engraved metal plate having some form of paint in the bottom of the "engraved" lines.

The materials and processes used to make the plastic plate material 24 are described in greater detail in U.S. Pat. Nos. 3,940,864; 4,047,996; 4,125,655; and 4,267,244.

A textured surface strip 26 is formed across the surface of the plastic plate 24 in the area where the graphics is to be secured. Without the texture, at least some air would almost certainly be entrapped and distributed under the transparent pressure sensitive adhesive mylar tape bearing the graphics so that there would be air bubbles, and the like which would make it clear to even the casual observer that the graphics is little more than a strip of pressure sensitive adhesive tape applied over the surface. The textured strip is used because it allows air to escape entrapment under the mylar strip as the strip is pressed down upon the plate tape. Once the air escapes, the surfaces of the tape and plastic plate may be pressed into such intimate contact so that the pressure sensitive tape cannot be detected by any normal viewing of the product. The result is that the observer is not aware that he is looking at anything more than the metal plate 22.

One method of applying the textured surface is shown in FIG. 2. The mylar tape is shown at 28. The graphics 30 applied to the plastic plate are printed on the underside of the mylar tape. A double-sided pressure sensitive adhesive tape 32 is applied to the bottom of the mylar tape 28, thus entrapping the graphics and preventing it from being rubbed or scratched off the tape. The machine which makes the tape 28–32, also applies a release paper 34 onto the bottom of the adhesive tape 32; however, the release paper has been removed and discarded by the time that the product reaches the assembly stage shown in FIG. 2.

The plastic plate 24 is substantially the same as the plastic plate shown and described in U.S. Pat. No. 3,940,864 and other patents cited above.

A tape 36, with a metallized surface matching the surface of plastic plate 24, is run through suitable rollers to give it a textured surface which will enable an escape of air between the upper surface of textured tape 36 and the lower surface of adhesive tape 32. This tape 36 has a pressure sensitive adhesive on the lower surface. Normally, but not necessarily always, the textured tape 36 is affixed to plastic plate 24 in the manufacturer's factory. Therefore, the tape 36 may or may not have a release paper on the bottom. Normally, an automatic insertion machine applies the tape. However, if the tape 36 is applied by the end user, there is not the same problem which exists which mylar tape 28 since the metallized surface of tape 36 makes it non-transparent and any entrapped air is irrelevant. Moreover, the texturing of the tape also enables air to escape at the interface between tape 36 and plastic plate 24.

As here shown, an optional graphic in the form of a company logo (for example) 42 has been preprinted into the textured plastic tape. This graphic or logo 42 is completely visible through the mylar tape 28. A pair of debossed lines 44, 46 are formed across the plastic plate on the opposite side of the space which receives the textured tape 36. Normally, these lines have a contrasting color, although that is not essential. Since, these debossed lines coincide with the edges of the various tapes, those edges are camouflaged and effectively non-visible. The debossable plastic plate may have any suitable "engraving" 47 which is applied at the factory, as described above.

The manufacturer makes the combination of plates 22, 24, and usually of textured tape 36. The user prints the graphics and applies the tape 28–32 at the point of use.

In FIG. 3, the tapes 28–34, and metal backing plate 22 are identical to the corresponding numbered items in FIG. 2. Here, however, the plastic plate 24 itself has been textured. It may be debossed as described above, but without any ink transfer or it may be run through suitable rollers or other embossing device so that the textured stripe 26 is embossed directly into the plastic plate 24, itself. This way, there is no need to place the textured tape 36 on the plastic plate. On the other hand, if the user elects to use the plate with the textured stripe 26, he is committed to applying the graphics in the area of that stripe. In this case, the graphic or company logo 42 is placed directly on the plastic plate 24. The user will elect to purchase either or both of the plates of FIGS. 2, 3, as he sees fit.

FIG. 4 shows an end view of an inventive device except that the combined thicknesses of the tapes 28, 32 and plastic plate 38 relative to the thickness of metal backing plate 22 are greatly exaggerated so that they will show. The ink 30 of the graphics actually has virtually no thickness. In reality, the combined thickness of items 28–32 is little more than a thick piece of paper; therefore, the fact that the tapes and plastic plates are a separate item from the metal plate is not too apparent to the observer.

The kit which the user receives to practice the invention is shown in FIGS. 5–14. The kit is preferably packaged in a case 60 (FIG. 5) comprising a top 62 hinged to a bottom 64 and, when opened, held upright by a suitable string, ribbon, chain or the like 66. The top 62 is recessed to contain a work board 68, and an instruction booklet 70, or the like. The bottom 64 contains a dense foam block 72 which has been formed or hollowed at 74, 76 to receive a printer 78 and other kits parts which are shown in the remainder of the Figures.

The printer 78 may take many different forms; however, one example of a printer which produces excellent results is a Brother "P-Touch" Printer. This printer has a conventionally arranged typewriter keyboard 80 which may be used to enter any suitable alpha-numerical characters. A first cassette 82 contains three spools 84–88 respectively carrying a transparent mylar tape, a double-sided adhesive tape, and a release tape. During printing, these three tapes are assembled within the printer in a manner described above with respect to FIG. 2. The printer 78 prints alpha-numerical characters 30 (FIG. 1) on the back of the mylar tape 28, attaches the adhesive tape 32 over the printing and onto the mylar tape, and then places the release paper 34 over the adhesive tape. Then, the printed length of the assembled printed tape is ejected from the printer and cut off.

A second cassette 90 contains firm ware which generates different graphics. For example, one cassette 90 may generate Roman letters, another may generate old English letters, and yet another could generate Greek letters, mathematical, and scientific symbols. The user may select any suitable ones of these character generator cassettes 90, as he sees fit.

The work board 68 (FIG. 6) includes a rigid steel plate 92 which contains and captures a dense foam pad 93 that protects any underlying and supporting surface, such as a desk top, for example. Each of the various work pieces which are placed on the work board 68 is held in place by magnets secured on their underside, as indicated by dotted lines M, for example. Currently, many different kinds of magnets are available which perform very well. The preferred magnets are plastic and are strong enough to hold the work pieces securely in place, but weak enough so that it is easy to intentionally separate the work piece from the work board.

The work pieces 96–100 are here shown as separate ones of the coined metal backing plates 22 (FIGS. 1–3) which are used to make the pins, badges, place cards, and the like. This way a plate may be a template for the same size and shape metal plate that will be used to make the end product. For example, metal backing plate 97 is an oval, plate 98 is a large rectangle, and plate 100 is a small rectangle. Any other suitable plate may also be used as a template. The idea is that the user may elect to trim the tape delivered by printer 78 in any of many different ways, by using a template which is identical to the plate that makes up the substrate of the name plates which is being made. For example, he may trim the tape by using either the small end or the large curve at the side of oval 97 as a guide.

Figure 7:
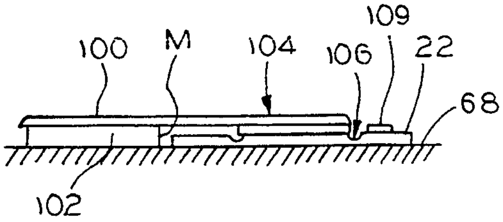
FIG. 7 is an end view of some of the tools of the kit being used.

FIG. 7 illustrates a use of one of the work pieces 96–100. The plate 100 has a magnet 102 bonded to its underside in order to hold it against the surface of work board 68. The thickness of the magnet 102 is selected to enable the matching plate 22 to fit fairly snuggly under it. When the user presses his finger against plate 100, as indicated at 104, the plate 22 is clamped securely in place against the surface of work board 68. Then, as shown at 106, by using the edge of the work piece 100 as a guide, the tape is trimmed by the use of a knife edge 108 shown in FIG. 8. The trimmed salvage 109 is then picked off the plastic plate 24 and discarded.

A "snibble board" 110 is provided to receive the salvage 109 which is trimmed off the tape. The snibble board comprises a pad of paper 111 which is securely clamped onto backing board 110. As each piece of tape salvage 109 is trimmed away, it is stuck onto the top sheet of paper on the pad 111. After the job is completed, the top sheet is torn off and discarded.

To assist in applying the tape to the name plate, a suitable easel 112 (FIG. 10) or 113 (FIG. 11) may be used. Easel 112 is simply a piece of steel which is bent into an L-shape. Easel 113 is also L-shaped; however, the work surface 116 may be a separate, relatively large plate 116 (a large version of plate 22) resting under gravity against easel 113 so that it may be removed and worked on a flat surface. Plate 116 rests against a ledge 117 at the toe and at the top and back of the L-shape. The easel 112 has an attached name plate 22*a* which acts as a support for the name plate 22*b* on which the graphics will be mounted. The large plate 116 on easel 113 is adapted to align the tape on a plurality of name plates 22 resting on the relatively large surface of plate 116. Or, easel 113 may provide a means for mounting graphics on a large plate itself. In each example, a blank plate 22 of the type being used is rested on the upright panel on the easel. This blank plate may include any pre-printed logos, or other graphic matter which appears on the finished product.

A T-square 118 is supplied to work in connection with the surfaces of name plates 22 and easels 112, 116. This T-square is especially valuable during a planning and lay out stage when a size and style of type is being selected. The T-square is most valuable if it has 64ths of an inch division, which approximately corresponds to one point of type. The printer 78 is adapted to print out in various point sizes.

Various methods may be used to display the final product of the invention. Some display and support techniques are shown in U.S. Pat. No. 4,459,772. The kit furnishes to the user includes any necessary pin backs, stands, tabs, and other devices, such as shown in U.S. Pat. No. 4,459,772.

Figure 13:
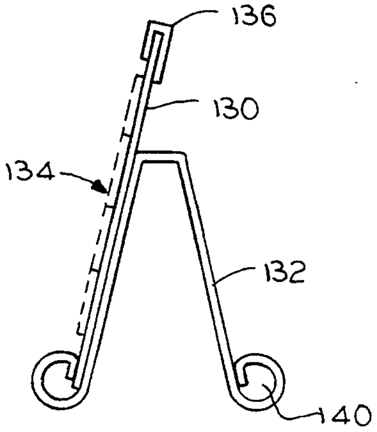
FIGS. 13, 14 are two views of a stand used to support and display the board of FIG. 12.
Figure 12:
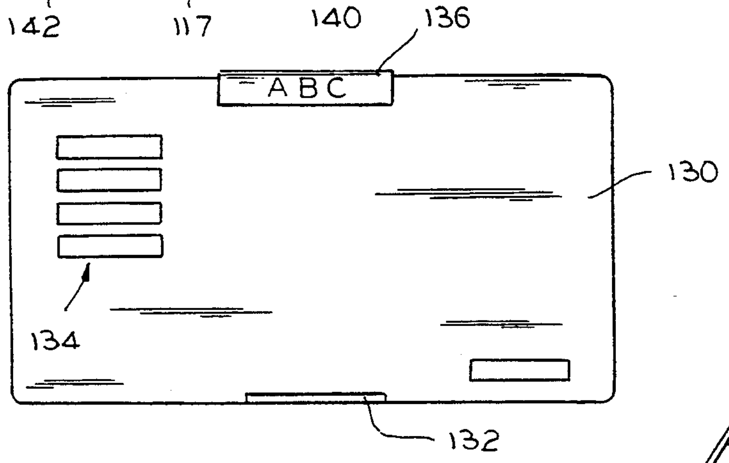
FIG. 12 is a plan view of a display board which is used to mount and display a plurality of the plates of FIGS. 1–4.
Figure 14:
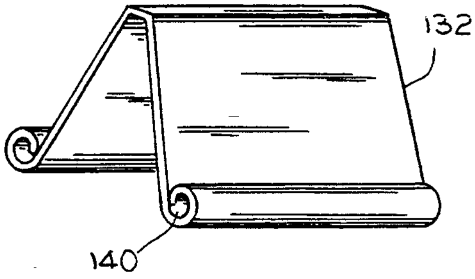

FIGS. 12–14 show a board 130 and stand 132. Board 130 might have a walnut grain, for example, surface with a plurality of name plates 134 attached thereto. The plate 130 may be a wooden board, or a steel plate covered by a woodgrain plastic, for example. When a steel plate is used, the name plates 134 may be attached thereto by magnets. A header plate 136 may simply rest under gravity on the top of the board 130.

When the plate 130 is of a size which is appropriately displayed on a desk or table, for example, a simple steel A-frame 132 (FIG. 14) may be provided to support it, as shown in FIG. 13.

Figure 8:
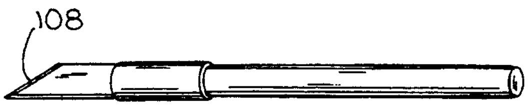
FIG. 8 shows a trimming knife used with the tools of FIG. 7.
Figure 10:
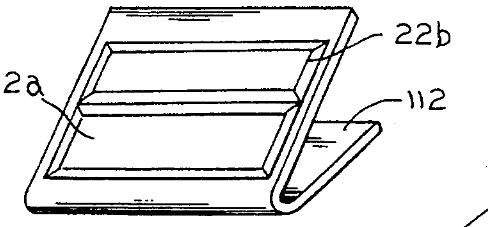
FIG. 10 is a perspective view of an easel used to align the tape on a single one of the decorative plates.
Figure 9:
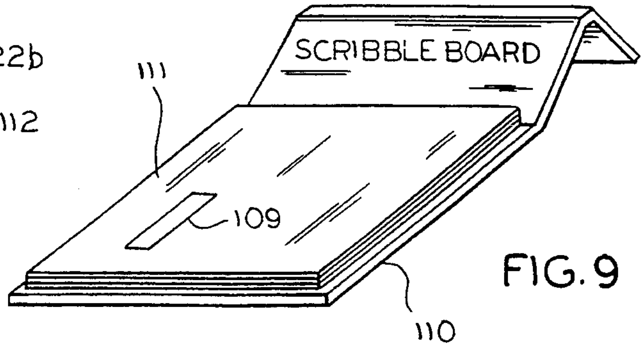
FIG. 9 is a perspective view of a pad that receives the salvage of the tape trimmed by the process illustrated in FIGS. 7, 8.
Figure 11:
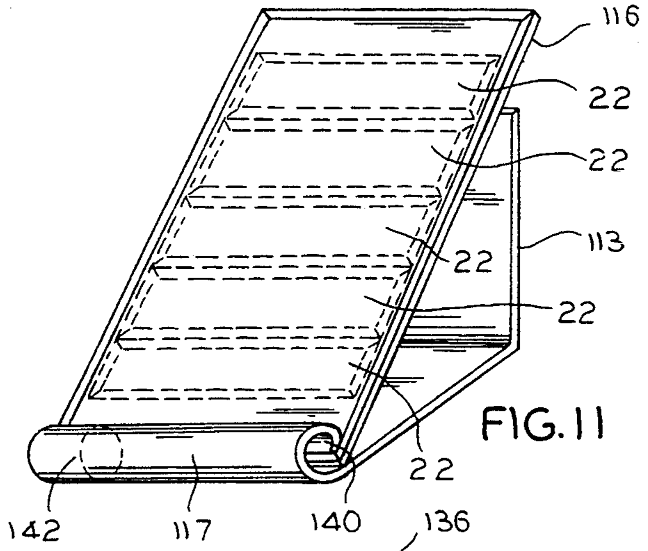
FIG. 11 is a perspective view of a different alignment easel which may be used with a larger plate or to mass produce, say, five name plates.

The bottom of the easel 113 or A-frame 132 is rolled to form a tube 140 having an interior diameter corresponding to the outside diameter of the knife of FIG. 8. One end of the tube 140 (FIG. 11) is closed by a rubber plug 142. Thus, the knife edge 108 may be inserted point first into the tube 140 for safety, especially when it is carried in the kit.

Those who are skilled in the art will readily perceive how to modify the invention. Therefore, the appended claims are to be construed to cover all equivalent structures which fall within the true scope and spirit of the invention.

The invention claimed is:

1. A graphic display, comprising a metal backing plate of a predetermined size; a plastic plate having a metalized surface for mounting centrally on said metal plate, said metal plate and said metalized surface having virtually the same appearance whereby said plastic plate and metal plate look like a single member when joined, a textured area on said metalized surface of said plastic plate; transparent tape having at least customized graphics printed on its rear side, said textured area having a shape and size adapted to receive said transparent tape; and adhesive means on the backs of said plastic plate and said transparent tape for assembling said graphics display; said texture including debossments which are deep enough to allow air to escape through said debossments of said texture as said transparent tape is being pressed into intimate contact over said textured surface on said plastic plate, the debossments of said texture preventing an entrapment of air bubbles under said transparent tape when it is adhered to said textured surface by allowing the air of the bubbles to escape through the debossments.

2. The display of claim 1 wherein said textured area is on a separate tape which is secured to said surface area on said plastic plate.

3. The display of claim 1 and graphics material preprinted on said separate tape to show through said transparent tape.

4. The display of claim 1 wherein said textured area is formed on the surface of said plastic plate.

5. The display of claim 1 and a graphic formed on said textured area for showing through said transparent tape.

6. The display of claim 5 and graphic material preprinted on said plastic plate to show through said transparent tape.

7. A do-it-yourself name plate comprising a debossable plastic plate having a thermoplastic plate covered by a thin film of material having a heat insulating quality that plays no part in spreading heat during a debossment process, an area debossed into an upper surface of said thermoplastic plate to form a textured surface, said thin film covering said thermoplastic plate following said debossment, a transparent plastic film with graphics on its underside, and means on the underside of both said plastic film and said graphics for adhering said transparent film over said textured surface, said debossed depressions forming textured surface passageways which enable air to escape from said textured surface as said transparent film is pressed down into intimate contact upon said debossed area in said thermoplastic plate, air escaping from between said transparent film and said plastic plate via the air passage ways provided by the debossed texture of said surface when said transparent film is adhered thereto, said texture preventing an entrapment of air bubbles under said transparent tape when it is adhered to said textured surface by allowing the air in the bubbles to escape through the dobossments.

8. The plate of claim 7 wherein said textured surface is on a separate tape interposed between said plastic plate and said transparent film.

9. The plate of claim 8 and debossed areas for camouflaging the edges of said tape.

* * * * *